US008418936B2

(12) United States Patent
Schaeffer et al.

(10) Patent No.: US 8,418,936 B2
(45) Date of Patent: Apr. 16, 2013

(54) SPRAY APPARATUS WITH RELEASABLE BOTTLE

(75) Inventors: Todd R. Schaeffer, St. Michael, MN (US); Craig Saunders, Rocky River, OH (US); Jeffrey Kalman, Cleveland Heights, OH (US); Nick Stanca, Westlake, OH (US)

(73) Assignee: Global Opportunities Investment Group, LLC, Rogers, MN (US)

( * ) Notice: Subject to any disclaimer, the term of this patent is extended or adjusted under 35 U.S.C. 154(b) by 266 days.

(21) Appl. No.: 12/770,399

(22) Filed: Apr. 29, 2010

(65) Prior Publication Data

US 2011/0266367 A1 Nov. 3, 2011

(51) Int. Cl.
*A62C 11/00* (2006.01)
*B65D 88/54* (2006.01)

(52) U.S. Cl.
USPC ........... 239/333; 239/332; 222/183; 222/325; 222/321.7; 222/333

(58) Field of Classification Search .......... 239/302–305, 239/329, 330, 331–334; 222/183, 325, 321.7–321.9, 222/333
See application file for complete search history.

(56) References Cited

U.S. PATENT DOCUMENTS

| 5,941,428 A * | 8/1999 | Behar et al. ................. 222/321.7 |
| 6,269,837 B1 * | 8/2001 | Arent et al. .............. 137/614.04 |
| 6,971,589 B2 | 12/2005 | Incardona et al. |

FOREIGN PATENT DOCUMENTS

| DE | 20020254 U1 | 2/2001 |
| EP | 1543884 A2 | 6/2005 |
| WO | 9405593 A1 | 3/1994 |

OTHER PUBLICATIONS

Austrian Search Report dated Apr. 11, 2011 from Austrian Application No. GM302/2010-5.

* cited by examiner

*Primary Examiner* — Christopher Kim
(74) *Attorney, Agent, or Firm* — David D. Brush; Westman, Champlin & Kelly, P.A.

(57) ABSTRACT

A sprayer and a releasable bottle are provided. The sprayer includes a main housing having a pump and a nozzle coupled in a material flow path. The housing further includes a bottle receptacle and a bottle adapter, which is fluidically coupled to the material flow path and has a lower, sealing surface and a lower fitting. An adapter spring applies a downward displacement force to the bottle adapter. The bottle is insertable into the bottle receptacle through an opening in the receptacle and has a top, which engages the lower sealing surface when inserted fully into the receptacle. The bottle includes a tube adapter that mates with the lower fitting and is coupled to a tube carried within the bottle. A latch retains the bottle in the receptacle in a latched state and releases the bottle from the receptacle in a released state.

12 Claims, 10 Drawing Sheets

SPRAY APPARATUS WITH RELEASABLE BOTTLE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to spray apparatus, such as hand-held sprayers. In one example the sprayer of the disclosure includes a removable bottle.

BACKGROUND

Spray apparatus are utilized in a wide range of settings. Some possible uses of such apparatus include storing and/or transporting a liquid or other material to be dispensed. For instance, a spray apparatus may have a container for storing liquid and a nozzle that provides a desired spray pattern.

One type of spray apparatus utilizes an electrolysis cell. A liquid such as water is drawn through the electrolysis cell to generate anolyte electrochemically activated (EA) liquid and catholyte EA liquid. The anolyte EA and/or catholyte EA liquids are then dispensed onto a desired surface.

SUMMARY

An aspect of the disclosure relates to a spray apparatus. In one embodiment, a sprayer includes:
a main housing, which comprises:
  a pump and a nozzle that are coupled in a material flow path;
  a first actuator, which activates the pump;
  a bottle receptacle comprising an opening;
  a bottle adapter, which is fluidically coupled to the material flow path and comprises a lower, sealing surface and a lower fitting; and
  an adapter spring that applies a downward displacement force to the bottle adapter;
a bottle insertable into the bottle receptacle through the opening and comprising a top, which engages the lower sealing surface when inserted fully into the receptacle and has a tube adapter that mates with the lower fitting and is coupled to a tube carried within the bottle; and
a latch which retains the bottle in the receptacle in a latched state and releases the bottle from the receptacle in a released state.

In an exemplary embodiment, the bottle adapter and the adapter spring are arranged such that:
  the displacement force biases the lower sealing surface against the top of the bottle when the bottle is fully inserted into the receptacle and the latched by the latch; and
  the displacement force ejects the bottle at least partially from the receptacle when the latch is in the released state.

In an exemplary embodiment, the bottle adapter comprises an adapter housing and a seal attached to the adapter housing, which forms the lower sealing surface.

In an exemplary embodiment, the bottle receptacle and the bottle have shapes such that the bottle is insertable into the receptacle in only a single orientation.

In an exemplary embodiment, the bottle comprises a main compartment having a substantially flat front surface with approximately squared off bottom corners and a curved back surface.

In an exemplary embodiment, the bottle comprises:
  a main compartment portion;
  a neck, wherein the tube adapter is located within the neck and comprises a central coupling that is supported along a central axis of the neck, wherein the tube has a first end attached to the coupling and a second end within the main compartment portion.

For example, the tube adapter comprises an outer annular ring press-fit into the neck and at least one spoke, which extends from the outer annular ring and supports the central coupling, wherein the central coupling comprises a passageway with an upper fitting adapted to engage a complementary fitting of the bottle adapter and a lower fitting adapted to engage the tube.

In an exemplary embodiment, the latch comprises a slidable plunger and the bottle comprises:
  a neck; and
  an annular lip extending at least partially around the neck, which comprises a latch strike having a chamfered, generally vertical side wall extending outwardly from the neck and a lower, generally horizontal surface configured to catch the slidable plunger.

In an exemplary embodiment, the main housing carries a light source, which is oriented to radiate light through the bottled retained within the receptacle; and the bottle comprises a light diffuser, which is visible through the main housing when the bottle is retained within the receptacle.

In an exemplary embodiment, the latch comprises:
  a slidable latch plunger, which is extended in the latched state and retracted in the released state;
  a latch spring that biases the latch plunger in the latched state; and
  a release actuator, which when actuated, moves the latch plunger from the latched state to the released state.

In an exemplary embodiment, the latch comprises a mechanism that translates displacement of the release actuator in a first direction into displacement of the latch plunger in a second, different direction. For example, the mechanism can be configured to translate displacement of the release actuator in a vertical direction into displacement of the latch plunger in a lateral direction.

In an exemplary embodiment, the sprayer further includes a bottle holster, which defines a shell for the receptacle and is housed within the main housing, wherein the bottle holster carries the latch.

Another aspect of the disclosure relates to a releasable bottle for insertion into a sprayer, such as a hand-held sprayer. In one embodiment, the bottle comprises:
  a main container portion comprising a bottom having a cross-section with a first corner;
  a neck having an opening into an interior of the main container portion and having an outer diameter surface with a latch strike;

a tube adapter within the neck and comprising a coupling that is supported along a central axis of the neck; and a tube having a first end attached to the coupling and a second end wedged into the first corner at the bottom.

Another aspect of the disclosure relates to a sprayer comprising:

a pump and a nozzle that are coupled in a material flow path;

a first actuator, which activates the pump;

a bottle receptacle;

a bottle adapter, which is fluidically coupled to the material flow path and comprises a lower, sealing surface;

a bottle insertable into the bottle receptacle and comprising a top, which engages the lower sealing surface when inserted fully into the receptacle;

a bottle release actuator; and a latch comprising a movable latch member that retains the bottle in the receptacle in a latched state and releases the bottle from the receptacle in a released state, and comprising a mechanism that translates displacement of the bottle release actuator in a first direction into displacement of the movable latch member in a second, different direction.

BRIEF DESCRIPTION OF THE DRAWINGS

FIGS. 3-1, 3-2, and 3-3 are perspective views of a bottle assembly.

FIGS. 6-1, 6-2, 6-3, and 6-4 are perspective views of a bottle holster and a ventilated bottle adapter assembly.

FIGS. 7-1, 7-2, 7-3, and 7-4 are perspective views of a ventilated bottle adapter assembly.

DETAILED DESCRIPTION OF ILLUSTRATIVE EMBODIMENTS

Figure 1:
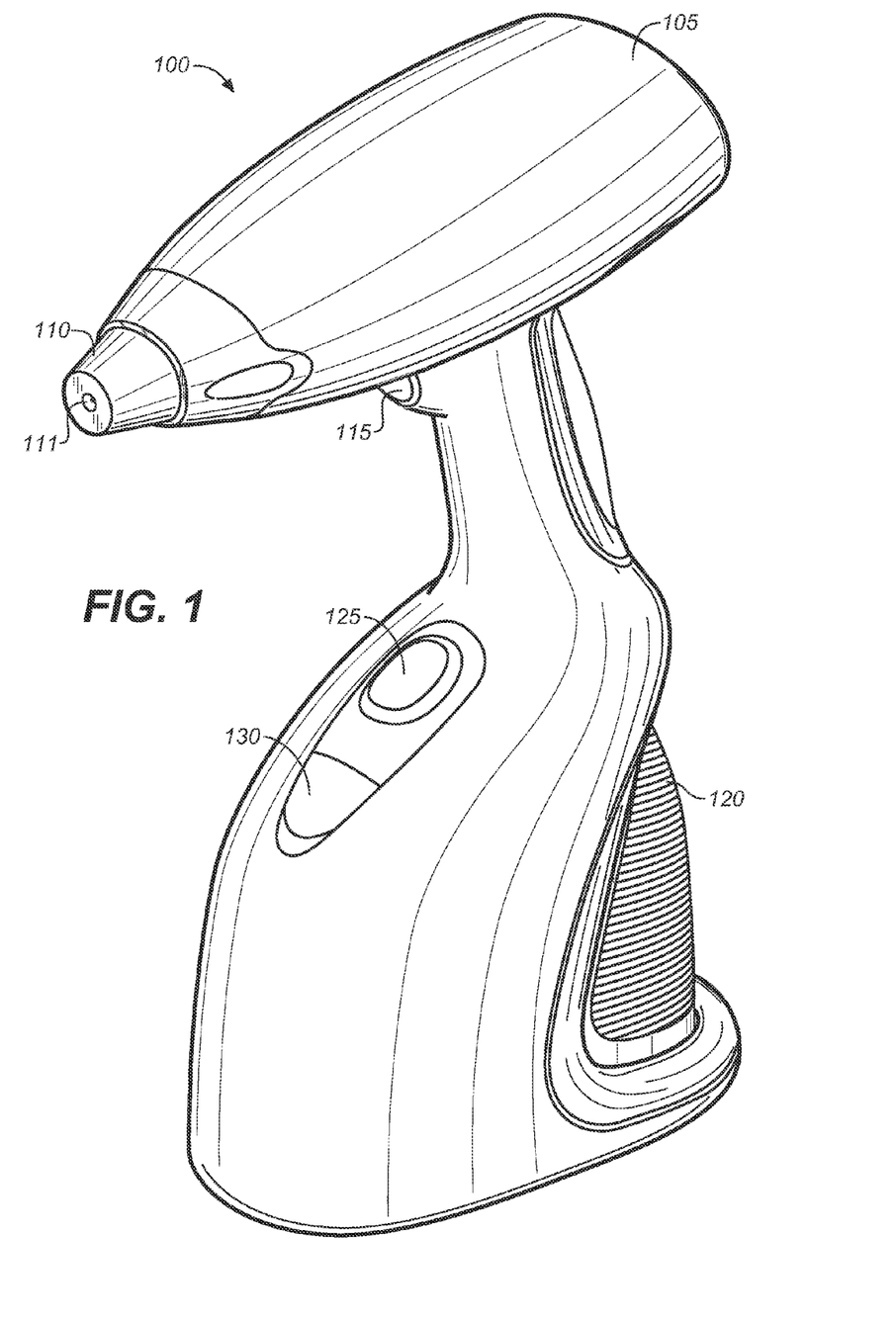
FIG. 1 is a front perspective view of a spray apparatus with a releasable bottle.
Figure 2:
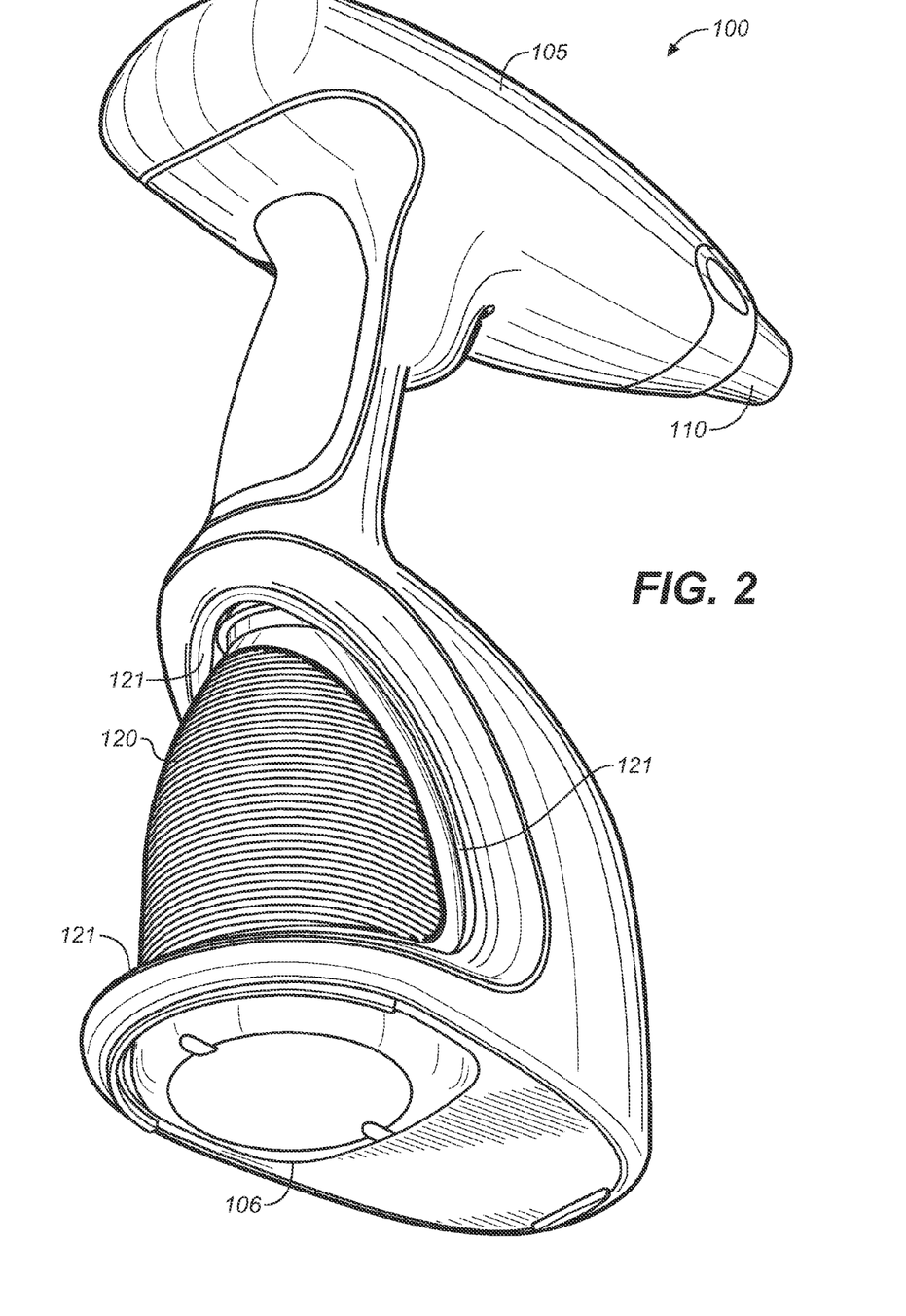
FIG. 2 is a back perspective view of the apparatus shown in FIG. 1.

FIG. 1 is a front perspective view of a spray apparatus (or sprayer) 100 with a releasable bottle according to an exemplary embodiment of the disclosure, and FIG. 2 is a back perspective view of the same sprayer 100. In this example, sprayer 100 comprises a hand-held spray apparatus. Sprayer 100 includes a housing 105, a nozzle cover 110 with an aperture 111, a spray actuator 115, a releasable bottle assembly 120, a bottle release button 125, and a battery recharge terminal cover 130.

Bottle assembly 120 is configured to hold some type of material such as, but not limited to, a liquid (e.g., water or a cleaning agent). Upon spray actuator 115 being activated, the fluid within bottle assembly 120 is transferred through sprayer 100 and expelled through aperture 111. Embodiments are not limited to any particular type of equipment for transferring material through sprayer 100. In the example shown in FIG. 4 that will be discussed shortly, activation of actuator 115 energizes an electrical pump that performs the material transfer. The electrical pump, as well as other possible electrical components, are illustratively powered by batteries carried by the sprayer. In one example, the batteries are rechargeable through a terminal located beneath cover 130.

Embodiments are not however limited to such electrical mechanisms and may be replaced by any other suitable system such as by a manually operated pump or pneumatic system, for example.

As can be seen in FIG. 2, sprayer housing 105 illustratively includes an aperture 106 at the bottom of the housing, which forms a passageway to a bottle receptacle within the interior of the housing for receiving bottle assembly 120. Aperture 106 is configured to enable bottle assembly 120 to be passed through aperture 106 when installed into housing 105 and passed back through aperture 106 when removed from housing 105. When bottle assembly 120 is inserted fully into the receptacle, the bottle assembly becomes latched or otherwise secured into place within housing 105 for operation, as discussed in more detail below. When the operator desires to remove bottle assembly from housing 105, such as for refilling, the operator depresses button 125 (shown in FIG. 1) to release the latch and permit bottle assembly 120 to pass through aperture 106. Any type of actuator can be used to release the latch in various exemplary embodiments.

Also as can be seen in FIG. 2, sprayer housing 105 optionally includes an aperture or window along the backside (and/or any other side) of the sprayer. The perimeter of the opening is labeled 121 in FIG. 2. In one example, the opening is characterized by a lack of material, whereas in another embodiment, the opening is characterized by material that is at least partially translucent. In one example, the opening 121 provides a window through which an operator can easily detect by visual inspection whether a bottle is attached to the sprayer and whether the bottle has any material (e.g., water) within it. Furthermore, an operator can detect the level of the material within the bottle (e.g., full or close to empty). An operator can, for instance, make sure that the bottle is full of water or other material before beginning a cleaning job so as not to run out of water during the middle of the job. As described in more detail below, in one exemplary embodiment, sprayer 100 illuminates the liquid in bottle 120 during spraying operations. In this embodiment, the opening permits the operator to observe the illumination. Accordingly, the backside opening may improve usability of the sprayer.

FIGS. 3-1, 3-2, and 3-3 show perspective views of one exemplary embodiment of bottle assembly 120, which can be inserted into the sprayer 100 shown in FIGS. 1 and 2. Bottle assembly 120 includes a neck and a main container portion. The neck includes a latch "strike" 302 that is adapted to engage a latch plunger or other movable latch member, for example, for securing bottle assembly 120 into sprayer 100. The neck further includes a top aperture 305 through which material can be inserted into and removed from bottle assembly 120.

Figure 31:
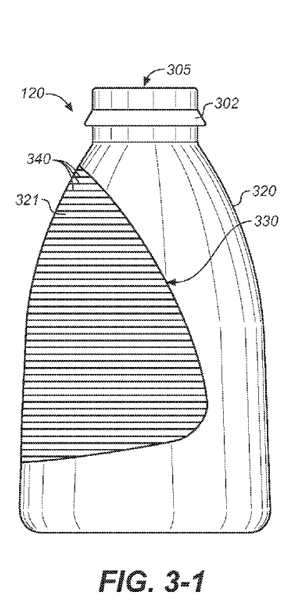
Figure 32:
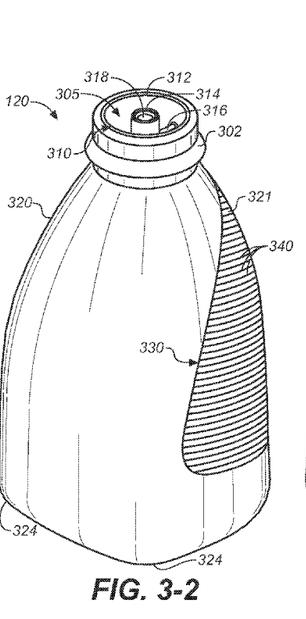
Figure 33:
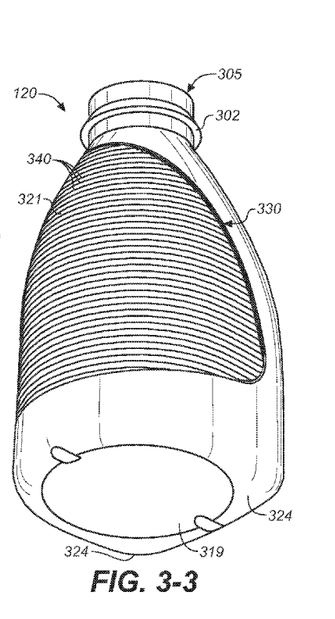

In an exemplary embodiment shown in these figures, the latch strike 302 is formed by an annular ring or lip (or other protrusion or recession). Annular ring or lip 302 can extend along the full perimeter of the neck as shown in FIGS. 3-1 through 3-3 or can extend along only a portion of the perimeter, for example. Annular ring or lip 302 illustratively provides a mechanism for bottle assembly 120 to be secured to sprayer 100. For instance, when bottle assembly 120 is inserted fully into sprayer 100, a latch plunger may engage the lower surface of annular ring 302 and lock the bottle assembly into place within the sprayer housing. In one example, annular ring 302 has a vertically-extending, chamfered sidewall, which extends outwardly from the neck to form a cam surface (or latch strike), which displaces the latch outwardly as the bottle assembly is inserted into the sprayer. When the bottle assembly becomes fully inserted, the latch plunger moves inward and "catches" the lower, generally horizontal surface of the ring, thereby securing the bottle assembly within the sprayer. More specific details of example latching mechanisms are shown in subsequent figures and discussed below.

As is shown in FIG. 3-2, top aperture 305 optionally includes a tube holder/adapter 310, which may be press-fit within the neck of the bottle, for example. Tube holder/adapter 310 illustratively includes an outer annular ring 312, a central coupling 314 and one or more spokes 316. The outer annular ring 312 engages the inner diameter surface of the neck and supports the central coupling 314 at the center of aperture 305 through spokes 316. In another embodiment, tube holder is formed integrally with the neck of bottle 120. The central coupling 314 has a tubular shape, for example, and is adapted to secure a piece of tubing (labeled 416b in FIG. 5) within the bottle assembly and is adapted to join the tubing to an adapter assembly 414 (shown in FIGS. 4-7) within the sprayer. For example, tube adapter 310 can include a lower fitting (such as a nipple) for receiving an upper end of tube 416b within bottle 120 and an upper fitting 318 adapted to engage the lower end of the adapter assembly 414 (shown in FIGS. 4-7) when bottle 120 is inserted fully into sprayer 100.

The main container portion of bottle assembly 120 includes a bottom surface 319, a front surface 320, and a back surface 321. Bottom surface 319 illustratively provides a flat or approximately flat surface such that bottle assembly 120 and/or any attached sprayer can be positioned and balanced on a surface, such as a table. In one example, as shown in FIG. 3-3, bottom surface 319 has a relatively flat circumferential region and a concave central region. The concave shape of the central region may stabilize the bottle about the flat circumferential region when the bottle rests on a surface and also provides a convenient location for placing the operator's fingers when the operator forces the bottle into aperture 106.

In an embodiment such as that shown in FIGS. 1 and 2, when bottle assembly 120 is installed within sprayer housing 105, the back surface 321 of bottle assembly 120 is orientated such that it faces opening 121, outwardly away from sprayer housing 105. The front surface 320 is oriented such that it faces inwardly towards the interior of sprayer housing 105. For instance, in FIGS. 1 and 2, the exposed areas of bottle assembly 120 correspond to a portion of the back surface 321. Bottle assembly 120 illustratively has a cross-sectional shape and/or has other surface features that permit the bottle assembly to be inserted into the receptacle of the sprayer housing in only a single orientation. For example, the lower portion of bottle 120 has a "D"-shaped cross section (e.g., front surface 320 is relatively flat with boxed corners 324, and back surface 321 is curved). The aperture 106 and receptacle area within sprayer housing 105 have a similar shape, which mates with bottle 120 in a single orientation only, for example. This feature of having only one possible bottle orientation provides several optional advantages. For example, as will be discussed later, the lower end of tubing 416b shown in FIG. 5 may be positioned within one of the boxed corners 324 of the D-shaped bottle such that in a typical spraying position, the bottle and tube are oriented to enable as much of the liquid as possible to be dispensed from the bottle.

In one exemplary embodiment, bottle assembly 120 further includes a light diffuser 330, which diffuses light passing through the bottle. For example, light diffuser 330 can include features that are formed into the material of the bottle itself (e.g., surface texture or roughness) and/or a material that is applied to the surface, such as a layer of film adhered to the surface. In one example, the diffuser 330 includes a series of horizontal protrusions or ribs 340 formed in back surface 321, as shown in FIGS. 3-1, 3-2, and 3-3. However, ribs 340 can have any orientation or geometric shape, for example. In one exemplary embodiment, sprayer housing 105 may carry a light source, such as one or more light emitting diodes ("LEDs") (described below with reference to FIG. 4). When spray actuator 115 is actuated into an "ON" state or position, sprayer 100 energizes the LEDs to illuminate liquid contained within the bottle. Light radiated from the LEDs is transmitted through bottle 120, from the front surface 320 (and/or any other bottle surface) to the back surface 321. Both surfaces 320 and 321 are optionally transparent or at least partially translucent such that they can transmit visible light. Liquid contained in bottle assembly 120 will also be illuminated by the light passing through the bottle. The front surface 320 is illustratively smooth or approximately smooth. The light radiates through the liquid or other material that may be in bottle assembly 120 and reaches the light diffuser 330 where the light is diffracted or otherwise scattered. This may allow the transmitted light to be seen more easily and/or give a visual impression that the liquid in the bottle is more fully illuminated. The light diffuser 330 illustratively covers only a portion of the bottle surface. For instance, in one embodiment, the light diffuser 330 covers a portion (such as the entire portion) of the surface area of the bottle that is exposed through the housing opening defined by perimeter 121 in FIG. 2.

The lighting devices (e.g., LEDs) that may be utilized in sprayer 100 may include those producing any color of light. The lighting devices could for instance be white, green, blue, red, and/or purple LEDs. The result of such a system is that embodiments of the present disclosure may provide an enhanced visual appearance that users may find desirable. In one scenario the lighting devices provide a color to the liquid and bottle assembly such as, but not limited to, green or red. For example, sprayer 100 controls the lighting devices as a function of an electrical operating characteristic (e.g., drawn current, voltage, and/or power) of an electrolysis cell carried in housing 105. Thus, the operation of the light devices can indicate whether the electrolysis cell is functioning properly and thus whether the spray output in fact has enhanced cleaning and/or sanitizing properties. For example, green LEDs may be lit upon depression of spray actuator 115 to illuminate the liquid within the bottle with a green color if the current drawn by the electrolysis cell is with a predefined range. If not, red LEDs may be lit to illuminate the liquid with a red color to indicate a "problem." The light diffuser 330 amplifies the visual impression provided by the LEDs. In addition, illumination of the liquid may give a visual impression/illusion that the liquid includes a chemical other than water or is otherwise "special" in a way in which users may have more confidence as far as cleaning ability. This may enhance the operator's confidence in the system, provide the operator with a better sense of proper functionality, or simply be aesthetically pleasing to the user such that he or she may want to use the device more frequently or use it instead of another device.

Furthermore, it should be noted that embodiments of bottle assemblies are not limited to being made from any particular materials. Bottle assemblies are illustratively made of plastic (i.e. thermoplastics or thermosetting polymers), glass or of any other material. The light diffuser may be molded or otherwise formed in the bottle material itself or may be formed of a separate element that is affixed to the bottle, for example.

Figure 4:
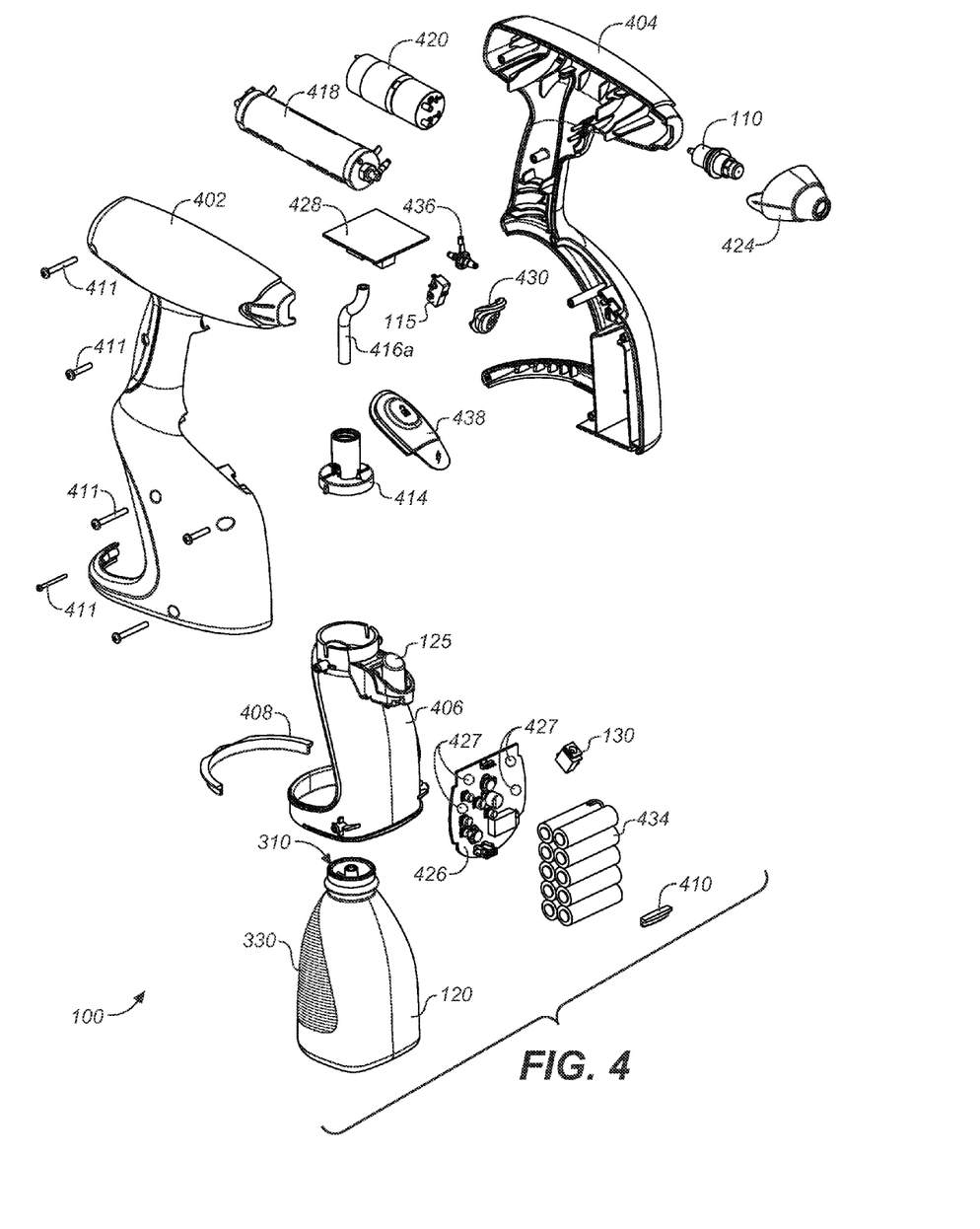
FIG. 4 is an exploded view of the spray apparatus.

FIG. 4 is an exploded view of a sprayer 100, according to an illustrative embodiment, which shows some additional components of the apparatus that are hidden in the previous figures. It should be noted however that some components such as electrical wires and material transfer tubing have been removed from the drawing for the sake of clarity. The same reference numerals are used in FIG. 4 as were used in the previous figures for the same or similar elements.

Sprayer 100 includes a right housing 402, a left housing 404, a bottle holster 406, a rear foot 408, and a front foot 410. These components illustratively form the main shell or housing in which the other components fit or are secured to. The housing components may be joined together in any way such as by snap fits, welds, adhesives, screws (e.g., screws 411), or by any other way or combination of ways.

The bottle holster 406 forms a shell that defines a receptacle for bottle assembly 120. As described above, bottle assembly 120 is "D" shaped, for example, and the receptacle within holster 406 is shaped such that the "D" shaped bottle can fit within the housing in only one orientation. Additionally, at least a portion of the bottle holster 406 is illustratively transparent or translucent such that it allows light from a light source to pass through holster 406 and reach bottle assembly 120.

Bottle holster 406 illustratively includes bottle release button 125 that releases bottle assembly 120 from being attached to holster 406 with one press of the button 125, for example. This feature will be further discussed below with reference to FIGS. 6-1, 6-2, 6-3, and 8. In an embodiment, bottle release button 125 may be protected by a cover 438. Embodiments are not however limited to those having a cover 438, and also include embodiments not having a cover 438.

Sprayer 100 optionally includes an electrolysis cell 418 and a pump 420 within the material dispensing flow path. Pump 420 pumps liquid from bottle assembly 120 through electrolysis cell 418 and out nozzle assembly 110. Electrolysis cell 418 and pump 420 are energized when the operator depresses sprayer trigger 115, for example. In one example, cell 418 has an ion exchange membrane that separates an anode and a cathode. As pump 420 draws a liquid (e.g., tap water) through electrolysis cell 418, cell 418 ionizes the liquid and separates it into an anolyte electrochemically activated (EA) liquid and/or catholyte EA liquid. The anolyte EA and catholyte EA liquids are, in an exemplary embodiment, combined into a single stream at the output of the cell (and/or at any other location along the output flow path) and dispensed as a single stream through nozzle assembly 110. In other embodiments, for example, one or both of the liquids are dispensed separately through one or more nozzle assemblies 110.

Embodiments can include any type of nozzle assembly 110. For instance, embodiments include nozzle assemblies 110 that provide any desired spray pattern (e.g., a solid cone or a hollow cone). Nozzle can be electrically conductive or non-conductive. In one example, nozzle cover 424 provides a dielectric cover for nozzle assembly 110 without interrupting or otherwise disturbing the spray pattern generated by nozzle assembly 110, for example.

Pump 420 is illustratively used to move material through sprayer 100. Embodiments of pump 420 include any type of pump. For instance, for illustration purposes only and not by limitation, pump 420 can include direct lift, displacement, velocity, buoyancy and gravity pumps. It should be noted however that embodiments are not limited to any particular method for transferring material through the sprayer. The electrical pump system could for instance be replaced with a manually driven system (e.g., a manually driven piston type pump).

Pump 420 and any other electrically powered components that may be included in a sprayer are illustratively powered by a battery pack 434. Battery pack 434 may include one or more single use batteries or one or more rechargeable batteries. In an embodiment utilizing rechargeable batteries, sprayer 100 may include a recharge port 130 for recharging the batteries. Recharge port 130 is optionally covered by cover 438 to protect the recharge port 130 from being exposed when not in use. Embodiments of the present disclosure are not however limited to only being powered by a battery pack. For example, for illustration purposes only and not by limitation, sprayer 100 could alternatively be powered an external AC or DC power source (e.g., powered by electricity from a regular wall outlet).

Sprayer 100 is shown as having two printed circuit board assemblies (PCBs), a main PCB 426 and an auxiliary PCB 428. It should be noted however that embodiments of the present disclosure are not limited to any particular PCB configuration and may have more or less PCBs, or may even utilize an alternative electrical configuration that does not require PCBs. Main PCB 426 and auxiliary PCB 428 illustratively include control circuits, memory, instructions, voltage regulators, etc. that may be needed or useful in the operation of sprayer 100.

In one embodiment, main PCB 426 controls the electrolysis cell 418 and pump 420 as a function of the state of sprayer actuator 115 being actuated between an "ON" state and an "OF" state. Main PCB 426 optionally includes one or more light sources such as, but not limited to, a plurality of LEDs (e.g., 4 LEDs). Light sources are illustratively placed or positioned on the surface of PCB 426 that is hidden in FIG. 4 to illuminate and radiate light in a direction toward bottle holster 406. One possible placement of LEDs is indicated by the four dashed circles 427 on PCB 426. As was described previously, LEDs can be utilized to illuminate the bottle assembly 120 and material contained within the assembly.

Optional auxilliary PCB 428 includes a control circuit for applying an AC voltage, for example, to the liquid output stream that is dispensed through nozzle 110. The AC voltage is applied through an electrode 436 that is located along the liquid flow path, just upstream of nozzle assembly 110. Electrode 436 is positioned to make electrical contact with the liquid that is dispensed through nozzle assembly 110. In another example, the AC voltage is applied to the nozzle assembly itself, which is electrically conductive. Electrode 436 has no corresponding return electrode of opposite polarity on sprayer 100. Rather, the surface being sprayed serves as the "return electrode" such that the output spray dispensed from the sprayer conducts electrical current to the surface.

As mentioned above, PCBs 426 and 428 are powered by battery pack 434 and are selectively energized and de-energized by sprayer actuator 115. When sprayer actuator 115 is depressed into the "ON" state, PCBs 426 and 428 are energized by battery pack 434 and apply suitable control voltages and currents in suitable patterns to the various components within the sprayer, including electrolysis cell 418, pump 420, LEDs 427 and electrode 436, for example. When sprayer actuator 115 is released into an "OFF" state, the PCBs 426 and 428 are de-energized.

A further aspect of the disclosure relates to the manner in which bottle assembly 120 is retained within bottle holster 406 and the manner in which the liquid flow path in the sprayer 100 interfaces with bottle assembly 120 to draw liquid (or other material) from the interior of the bottle. Certain embodiments of sprayers, such as the one shown in FIG. 4, include a ventilated bottle adapter 414. When sprayer 100 is fully assembled and bottle assembly 120 is securely engaged/attached within the receptacle formed by bottle holster 406, adapter 414 engages and forms a seal with the top aperture 305 of bottle assembly 120 that reduces the likelihood of material within bottle assembly 120 from unintentionally escaping (e.g., leaking). As shown in more detail below, adapter 414 includes a passageway that runs through the center of the adapter and has an upper fitting, such as a nipple, which attaches to the lower end of tube section 416a. The other end of tube section 416a can be coupled to the input of electrolysis cell 418, for example, or another component or section of the flow path through the sprayer.

The lower surface of adapter 414 engages the top aperture 305 of bottle assembly 120 and has a lower fitting that engages the central coupling 314 of tube holder/adapter 310 (shown in FIG. 3-2) on bottle assembly 120. The lower fitting aligns the internal passageway of adapter 414 with the passageway through central coupling 314. Adapter 314 thereby fluidically couples tube section 416a of sprayer 100 with the tube section 416b within bottle assembly 120 when the bottle assembly is fully inserted within the sprayer. Additionally, as will be described in greater detail with respect to FIGS. 7-1, 7-2, 7-3, and 7-4, adapter 414 optionally includes a venting system. The venting system allows for air to enter into bottle assembly 120 to prevent a vacuum from forming in the bottle assembly 120.

Figure 5:
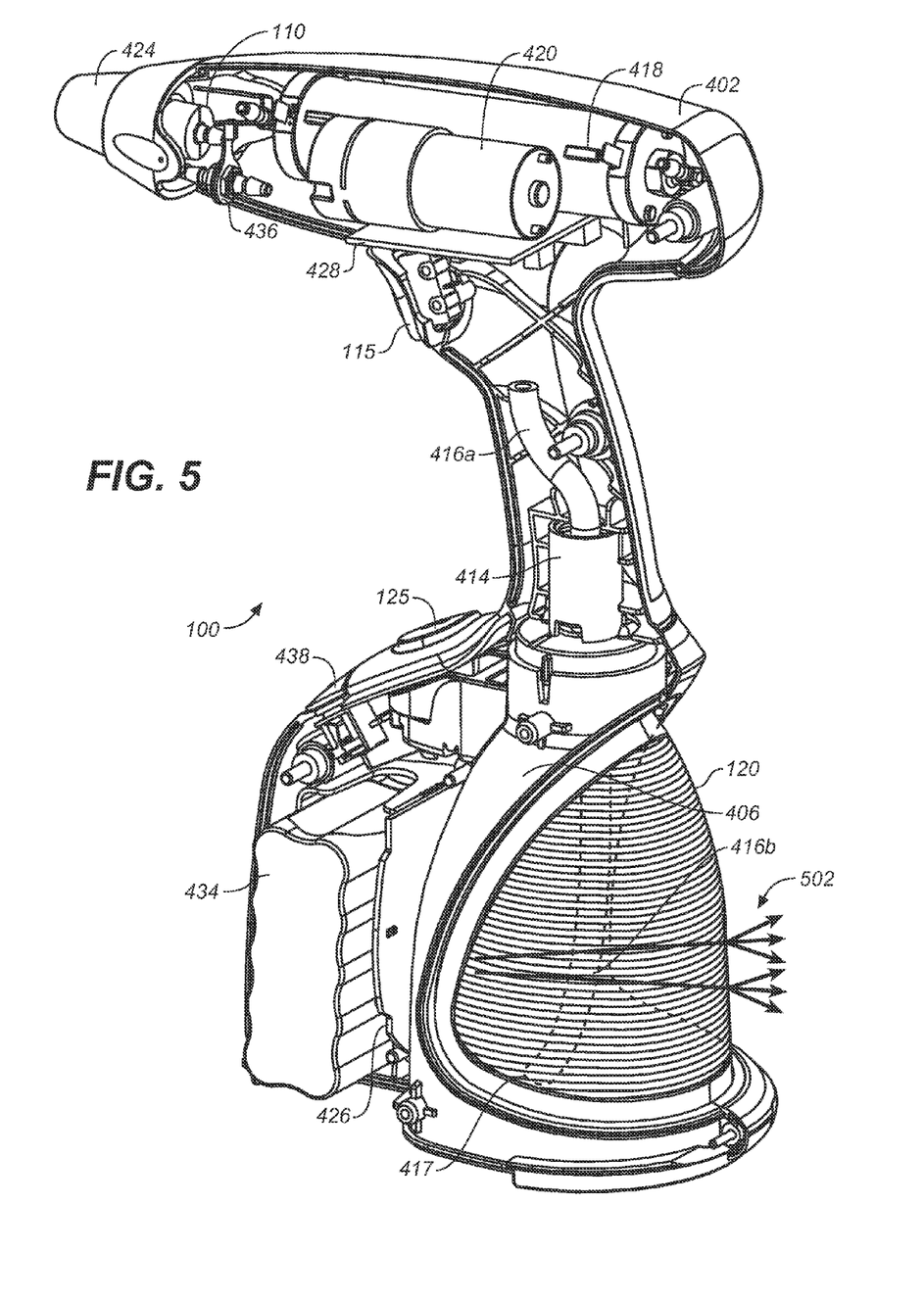
FIG. 5 is a perspective view of a partially assembled spray apparatus.

FIG. 5 is a perspective view of sprayer 100 in partially assembled state. In the apparatus shown in FIG. 5, the left housing portion 404 has been removed to show how some of the components mounted within the apparatus and how the components are oriented relative to each other. Sprayer 100 has the same or similar components as sprayer 100 shown in FIG. 4 and the like components are numbered the same. For instance, sprayer 100 includes a right housing 402, an electrolysis cell 418, a pump 420, a nozzle assembly 110, a nozzle cover 424, a spray actuator 115, a bottle release and power supply cover 438, a battery pack 434, a ventilated bottle adapter assembly 414, a bottle holster 406, a bottle assembly 120 and tubing 416a/416b.

Cell 418, pump 420, nozzle assembly 110, PCB 428 and electrode 436 are held within a head of sprayer 100. Adapter 414 is held within a neck of sprayer 100. Bottle holster 406, PCB 426, battery pack 434 and bottle 120 are held within a base of sprayer 100. Other arrangements can also be used in alternative examples. As shown in FIG. 5, the upper surface of bottle assembly 120 engages the lower surface of bottle adapter 414 when the bottle assembly is fully inserted within sprayer 100. Adapter 414 fluidically couples sprayer tubing 416a with tubing 416b, which is located within bottle assembly 120, such that material within bottle assembly 120 can be pumped from bottle assembly 120 through sprayer 100. In one particular embodiment, a lower end 417 of tubing 416b is wedged into a front bottom corner of bottle assembly 120 to improve the ability to remove all of the material from the bottle assembly, such as when sprayer 100 is oriented in a typical spray position with nozzle assembly 110 being pointed downward toward a surface being sprayed. As can be seen in FIG. 3-3, the bottom surface 319 of bottle assembly 120 illustratively has sharp or boxed corners 324 along the front 320 of the bottle assembly and has no corners or has a continuous curve along the back surface 321 of the bottle assembly, for example. This shape helps to ensure that the tubing end 417 remains wedged in one of the front boxed corners 324. Operators may for instance hold the sprayer in a slightly downward angled orientation. This would be the case for example for cleaning the top of a surface (e.g. a table or kitchen counter). In this orientation, liquid contained in bottle assembly 120 will tend to collect in the bottom front corners of the bottle. Because the tubing end 417 is located in one of the bottom front corners of the bottle, the apparatus will be better able to access and pull out most of material in the bottle.

Arrows 502 represent light radiated from LEDs 427 (shown in FIG. 4) carried by PCB 426. The radiant light 502 passes through bottle holster 406, the front surface of bottle 120, any liquid contained within the bottle and out the back and/or side surfaces of the bottle. Upon reaching the light diffuser, the radiant light further diffuses, as shown by the arrows.

It is worth noting at this time that although the figures such as FIGS. 4 and 5 show specific parts arranged in a specific manner that embodiments of the present disclosure are not so limited. Components could be easily exchanged with different components and the components could be arranged differently. The examples shown in the figures are for illustration purposes and not intended to imply any limitations to the scope of embodiments.

FIGS. 6-1, 6-2, 6-3, and 6-4 are additional illustrations of one embodiment of bottle holster 406 assembled onto bottle holster 406. FIG. 6-1 is a front perspective view of the assembly. It shows the bottle holster 406 and adapter 414 positioned together as they would be in a fully assembled apparatus. As can be seen in the figure, bottle receptacle area 601 is empty (i.e., there is no bottle shown in the figure). Bottle holster 406 includes bottle release button 125, which actuates a latch that engages the annular lip 302 (shown in FIG. 3) of a bottle 120 when the bottle is inserted into receptacle 601, thereby retaining the bottle within the receptacle. Depressing button 125 releases the latch from the annular lip. Button 125 is biased in a normally elevated position in which the latch is forced into a locked or engaged state. By depressing button 125, the latch is forced into an unlocked or released state.

Figure 62:
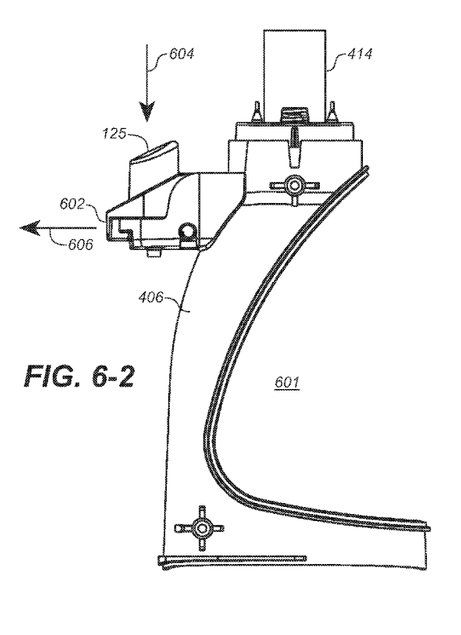
Figure 64:
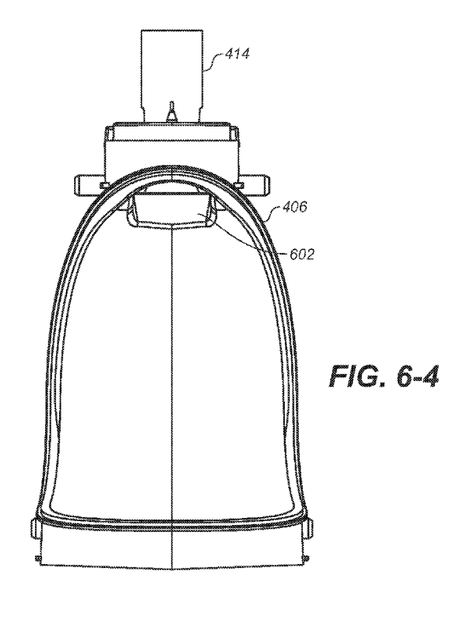
Figures 71, 73:
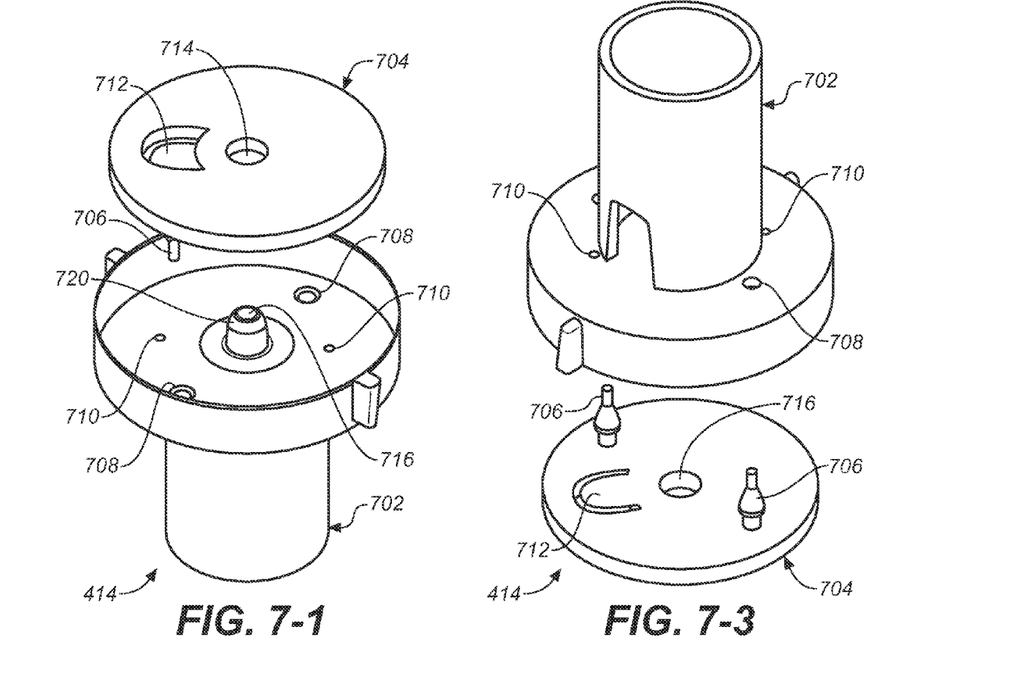

FIG. 6-2 is a side view of bottle holster 406 and adapter 414. Bottle holster 406 illustratively includes latch 602. A first portion of latch 602 is shown in FIG. 6-2, which is external to the bottle receptacle 601. A second portion of the latch extends into the receptacle of holster 406 and is configured to catch or press against the annular lip 302 a bottle that is positioned within the holster 406 (e.g., by catching the lower surface of the annular lip) or some other protrusion or recess formed in the bottle. The second portion of the latch 602 (i.e., the portion that catches a bottle) is shown and labeled in FIG. 6-4.

When button 125 is in the normal, vertically elevated state, the second portion of latch 602 is forced to engage the neck of the bottle. As an operator presses button 125 downward in the direction shown by arrow 604, latch 602 is retracted outwardly in the direction shown by arrow 606 into the unlocked, released state. This causes the back of the latch 602 to move away from the bottle neck area, and any bottle that was attached to the housing is released.

Figure 8:
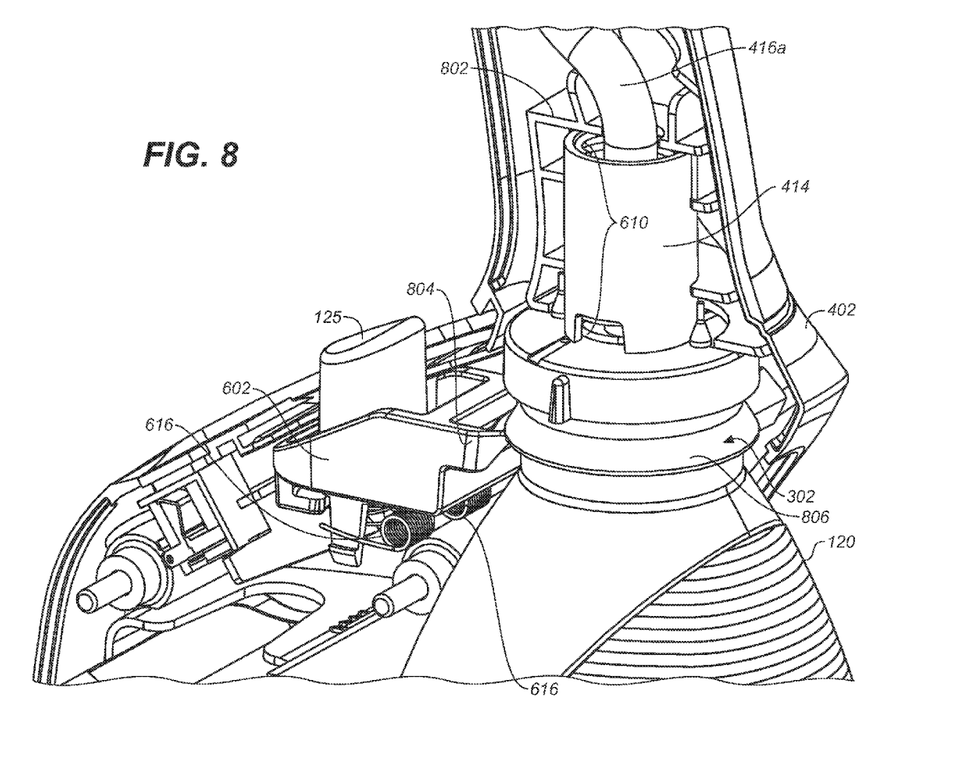
FIG. 8 is a cut-away view of the spray apparatus illustrating latch engaging a bottle.

FIG. 6-3 is an exploded view of bottle holster 406 and adapter assembly 414. Adapter assembly 414 optionally includes a spring 610 that biases the adapter assembly 414 downward in the direction shown by arrow 611. The downward force biases the adapter assembly 414 against the upper rim of the opening of any attached bottle when the bottle is fully inserted into housing 125 and latched by latch 602. Consequently, a tight seal is provided between an attached bottle and adapter assembly 414. Additionally, this force also serves to downwardly displace an attached bottle in the direction of arrow 611 when the bottle is released by latch 602. This downward displacement "ejects" the bottle out of receptacle area 601, through opening 106 (shown in FIG. 1). When a bottle is inserted fully into receptacle 601, the upper rim of the bottle forces adapter 414 upwardly and thus spring 610 into a compressed state. The position of upper end of spring 610 can be retained by, for example, a flange formed in the neck of the bottle housing as shown in FIGS. 5 and 8. The ejection force applied by spring 610 when the latch is determined by the mechanical properties of the spring. A desired ejection force can be selected by trial and error using springs with different properties, for example. In one example, the spring provides enough displacement force to eject the bottle partially by a small distance, such as up to an inch, but not enough to eject the bottle fully from the receptacle.

Figure 63:
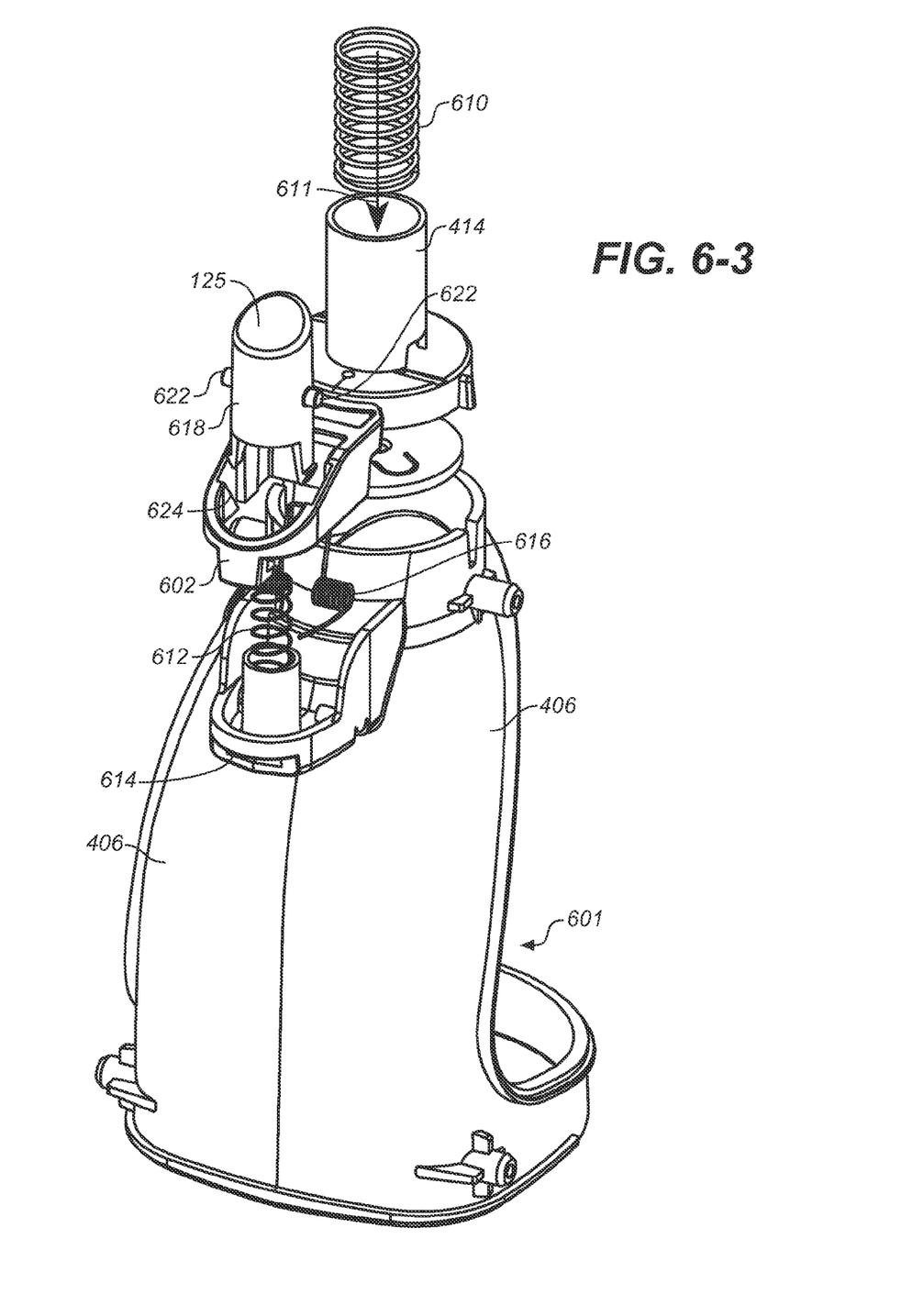

The latch mechanism within bottle holster 406 includes bottle release button 125, slidable latch 602, release button spring 612, fixed latch support 614, and one or more latch springs 616. Button 125 has a shaft 618 that that forms a sleeve over post 620. The shaft includes one or more guide pins 622 for retracting the latch 602 from the extended, locked state to the retracted, released state. In this example, there are two guide pins 622 on opposing sides of the button shaft. Guide pins 622 ride within diagonally oriented grooves or guides 624 in latch 602. The guides 624 have slanted guide surfaces form an acute angle (for example) relative to a vertical axis of the bottle holster 406 such that when button 125 is depressed in the downward, vertical direction of arrow 604 (shown in FIG. 6-2), the guide pins 622 move downward along the guides 624 in a direction substantially normal to the vertical axis while forcing the guide surfaces to move outwardly in a lateral direction indicated by arrow 606 (shown in FIG. 6-2). The guide pins 622 ride along the guides 624 and force the slidable latch 602 to the retracted state due to the angled surfaces of the guides. Latch spring 616 biases the slidable latch 602 into the normally extended, latched state. When button 125 is released, button spring 612 forces button 125 upward, and latch spring 616 forces latch 602 into the extended, latch state. When button 125 is depressed against button spring 612, guide pins force latch 602 to slide against spring 616 and retract across fixed latch support 614 into the unlocked state.

In one example, the release button and latch mechanism are designed such that the force needed to displace the button downwardly and retract the latch mechanism is high enough to avoid accidental release of the latch due to mild impacts forces cause by dropping the bottle and incidental contact with the release button. However, the required force is selected to be low enough that the button may be easily depressed by the user when the user intends to remove the bottle from the sprayer. The required release force is determined primarily by the mechanical properties of bottle release spring 612, which can be selected by trial and error, for example.

Figure 61:
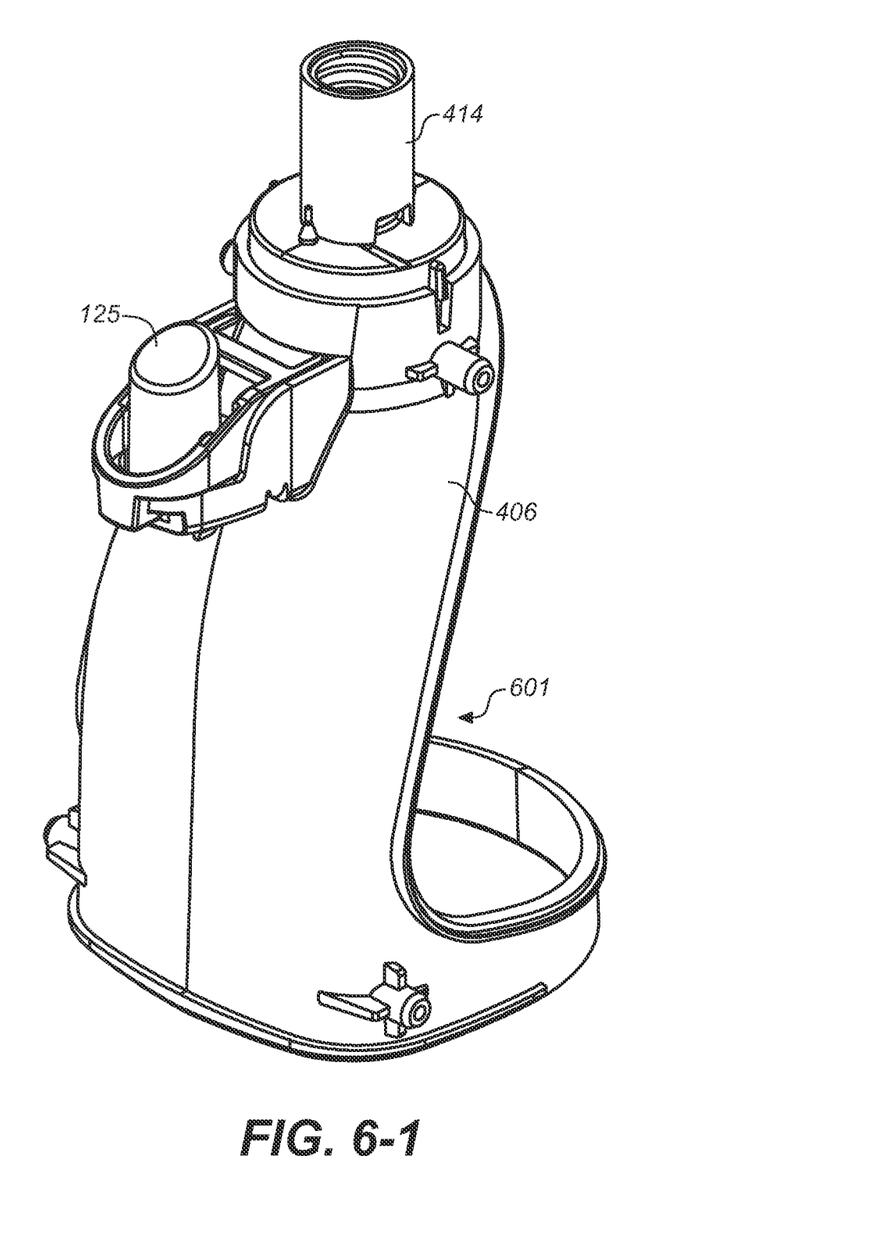

In the particular example shown in FIGS. 6-1 through 6-3, the latch comprises a mechanism that translates vertical displacement of the release actuator (e.g., button 125) into lateral displacement of the latch plunger. The guide pins 622 and guides 624 translate the mechanical force applied in a first, vertical direction to the release button 125 into movement of latch 602 in a second, lateral direction. For example, vertical displacement of release button 125 in the direction of arrow 604 is translated into lateral movement of latch 60 in the direction of arrow 606. In this example, the angle between vertical and lateral displacement is about 90 degrees. Other angles can be used in other examples, such as any suitable acute or obtuse angle. In one example, the angle is less than 180 degrees and greater than zero degrees.

FIGS. 6-2 and 6-4 illustrate the general shape of receptacle area 601, according to one example, which forms a self-guided "docking station" for receiving bottle 120. Although receptacle area 601 and bottle 120 have shapes that allow the bottle to be inserted into the receptacle are in only a single orientation, these shapes are also forgiving in the sense that the shapes self-guide the bottle into the correct orientation during insertion. As shown in FIG. 6-4 and FIGS. 3-1 to 3-3, the upper portions of bottle 120 and receptacle area 601 have somewhat rounded shapes. The rounded shoulders of bottle 120 smoothly transition into a more squared-off, D-shaped bottom portion of the bottle. Receptacle area 601 has a similar shape transition. The smooth transition between the rounded shoulders and the squared-off, D-shaped bottom portion can help guide the bottle into the proper orientation upon insertion, even if the bottle is inserted slightly off-axis or slightly rotated from the proper orientation.

FIGS. 7-1, 7-2, 7-3, and 7-4 show additional views of the bottle adapter 414, according to a specific, non-limiting example of the present disclosure. FIGS. 7-1 and 7-2 show bottom and top views, respectively, of adapter 414, and FIGS. 7-3 and 7-4 show bottom and top views, respectively, of adapter 414 in an assembled state.

Figures 72, 74:
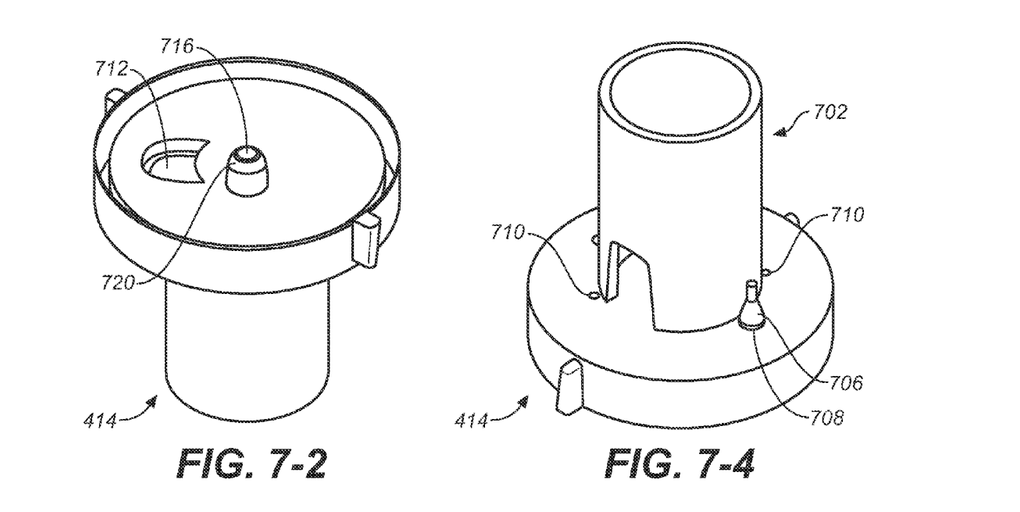

Adapter 414 optionally includes, a main housing 702 and a vented seal 704. Main housing 702 is illustratively rigid such that its shape is not easily deformed or changed, and seal 704 is illustratively flexible. For instance, seal 704 may be made out of a material such as, but not limited to, rubber. In one example, seal 704 includes a pair of mounting tabs 706, which fit through and secure to a corresponding pair of mounting apertures 708 in main housing 702. FIG. 7-4 shows tabs 706 inserted into mounting apertures 708. In the specific example shown in the figures, there are two apertures 708 and mounting tabs 706. Embodiments are however not limited to any particular number of apertures or mounting pieces and may have more or less than the illustrated two.

In an assembled sprayer, seal 704 acts as a seal between adapter's main housing 702 and the upper rim of an attached bottle. In other words, seal 704 prevents material within the bottle from escaping. As is shown in the figures, seal 704 includes a one-way ventilation lip or flap 712, which rests against the lower surface of main housing 702. Lip 712 is aligned to cover a ventilation hole/aperture 710, which extends through main housing 702. Lip 712 forms a seal about ventilation hole 710 to prevent material within the bottle from flowing out through the ventilation hole. For example, when material (e.g., water) within the bottle presses against ventilation lip 712, the material forces the ventilation lip upward against the ventilation hole 710, thereby preventing the material from escaping through the hole. In the other direction, ventilation lip 712 and hole 710 allow air to enter an attached bottle during use. For instance as material is pumped from the bottle, the removal of material creates a vacuum within the bottle (i.e., the air pressure within the bottle becomes less than the outside ambient air pressure). The difference in air pressure causes the ventilation lip 712 to move downward and allow air to enter the bottle through hole 710. Accordingly, the air pressure within the bottle is maintained at a value that is approximately the ambient pressure. Adapter housing 702 and seal 704 further include material transfer holes 714 and 716. Material (e.g., water) included within an attached bottle is transferred into and out of the bottle through holes 714 and 716. In this embodiment, adapter housing 702 includes a lower fitting 720 which mates the central coupling 314 of the bottle assembly (shown in FIG. 3-2) when the bottle assembly is fully inserted into the sprayer. Thus, fitting 720 fluidically aligns and couples material transfer hole 716 to the piece of tubing 416b contained in the bottle assembly, through the bottle's central coupling 314.

Certain embodiments, such as those shown in the figures, include more than one vent hole 710. This may provide for some advantages in assembling or making such devices. For instance, vent piece 704 can be attached to housing 702 in at least two different orientations, one orientation as shown in the figures and another that is rotated one hundred and eighty degrees. In either orientation, the ventilation lip 712 will be aligned to a vent hole 710 and the bottle will be vented.

FIG. 8 is a cut-away view of a sprayer, which shows a bottle assembly 120 is secured to sprayer 100 in greater detail. The view in FIG. 8 shows tube 416a fit onto a fitting (such as a nipple) within bottle adapter 414 and the lower surface of adapter 414 presses against the upper rim of attached bottle 120 by adapter spring 610. The upper end of adapter spring 610 is retained by housing flange 802.

Regarding the latch mechanism, FIG. 8 shows latch springs 616 forcing latch 602 against the neck of bottle 120. Latch 602 forms a plunger that has a catch 804, which catches the lower edge of annular lip 302 of bottle 120 when the bottle is fully inserted into the sprayer. Annular lip 302 has a chamfered sidewall 806 that forms a latch strike, which displaces catch 804 slightly as bottle 120 is inserted into the sprayer and lip 302 passes the catch. Once catch 804 reaches the lower edge of the lip 302, latch 602 and catch 804 spring back into a fully extended position in which catch 804 resets under lip 302, thereby retaining the bottle within the sprayer until released by depression of button 125. The lower edge of catch 804 is angled to mate with the chamfered sidewall 806 of lip 302 so assist catch 804 in riding along the lip during insertion of the bottle.

As has been described above and shown in the figures, embodiments of the present disclosure include sprayer that have features that may provide some advantages in at least certain situations. Embodiments for example may include a latching mechanism that allows for a bottle to be easily attached and detached (e.g., by an operator pressing a button/actuator). Embodiments may also include other advantageous features such as one or more light diffusers that may provide for greater illumination of the bottle by an optional light source. Embodiments of the present disclosure illustratively include sprayers that have any one or more combination of the described features and are not limited to any particular configuration (e.g., those shown in the figures).

A commercial embodiment of the sprayer shown and described with reference to the attached figures and components thereof, is presently available in a hand-held spray bottle form, which is distributed by, and available from, ActiveIon Cleaning Solutions, LLC of St. Josephs, Minn., U.S.A. under the name "Ionator HOM™". However, embodiments of the present disclosure and the issued claims thereof are not limited to that implemented in the commercial embodiment.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A sprayer comprising:
 a main housing, which comprises:
  a pump and a nozzle that are coupled in a material flow path;
  a first actuator, which activates the pump;
  a bottle receptacle comprising an opening;
  a bottle adapter, which is fluidically coupled to the material flow path and comprises a lower, sealing surface and a lower fitting; and
  an adapter spring that applies a downward displacement force to the bottle adapter;
 a bottle insertable into the bottle receptacle through the opening and comprising a top, which engages the lower sealing surface when inserted fully into the receptacle and has a tube adapter that mates with the lower fitting and is coupled to a tube carried within the bottle, wherein the bottle comprises:
  a main compartment portion;
  a neck, wherein the tube adapter is located within the neck and comprises a central coupling that is supported along a central axis of the neck, wherein the tube has a first end attached to the coupling and a second end within the main compartment portion, wherein the tube adapter comprises an outer annular ring press-fit into the neck and at least one spoke, which extends from the outer annular ring and supports the central coupling, and wherein the central coupling comprises a passageway with an upper fitting adapted to engage a complementary fitting of the bottle adapter and a lower fitting adapted to engage the tube; and
 a latch which retains the bottle in the receptacle in a latched state and releases the bottle from the receptacle in a released state.

2. The sprayer of claim 1, wherein the bottle adapter and the adapter spring are arranged such that:
 the displacement force biases the lower sealing surface against the top of the bottle when the bottle is fully inserted into the receptacle and latched by the latch; and
 the displacement force ejects the bottle at least partially from the receptacle when the latch is in the released state.

3. The sprayer of claim 1, wherein the bottle adapter comprises an adapter housing and a seal attached to the adapter housing, which forms the lower sealing surface.

4. The sprayer of claim 1, wherein the bottle receptacle and the bottle have shapes such that the bottle is insertable into the receptacle in only a single orientation.

5. The sprayer of claim 4, wherein the main compartment portion has a substantially flat front surface with approximately squared off bottom corners and a curved back surface.

6. The sprayer of claim 1, wherein:
 the latch comprises a slidable plunger; and
 the bottle comprises:
  an annular lip extending at least partially around the neck, which comprises a latch strike having a chamfered, generally vertical side wall extending outwardly from the neck and a lower, generally horizontal surface configured to catch the slidable plunger.

7. The sprayer of claim 1, wherein the latch comprises:
 a slidable latch plunger, which is extended in the latched state and retracted in the released state;
 a latch spring that biases the latch plunger in the latched state; and
 a release actuator, which when actuated, moves the latch plunger from the latched state to the released state.

8. The sprayer of claim 7, wherein the latch comprises a mechanism that translates displacement of the release actuator in a first direction into displacement of the latch plunger in a second, different direction.

9. The sprayer of claim 8, wherein the mechanism translates displacement of the release actuator in a vertical direction into displacement of the latch plunger in a lateral direction.

10. The sprayer of claim 1, further comprising:
a bottle holster, which defines a shell for the receptacle and is housed within the main housing, wherein the bottle holster carries the latch.

11. A sprayer comprising:
a main housing, which comprises:
  a pump and a nozzle that are coupled in a material flow path;
  a first actuator, which activates the pump;
  a bottle receptacle comprising an opening;
  a bottle adapter, which is fluidically coupled to the material flow path and comprises a lower, sealing surface and a lower fitting; and
  an adapter spring that applies a downward displacement force to the bottle adapter;
a bottle insertable into the bottle receptacle through the opening and comprising a top, which engages the lower sealing surface when inserted fully into the receptacle and has a tube adapter that mates with the lower fitting and is coupled to a tube carried within the bottle; and
a latch which retains the bottle in the receptacle in a latched state and releases the bottle from the receptacle in a released state, wherein:
the main housing carries a light source, which is oriented to radiate light through the bottled retained within the receptacle; and
the bottle comprises a light diffuser, which is visible through the main housing when the bottle is retained within the receptacle.

12. A sprayer comprising:
a pump and a nozzle that are coupled in a material flow path;
a first actuator, which activates the pump;
a bottle receptacle;
a bottle adapter, which is fluidically coupled to the material flow path and comprises a lower, sealing surface;
a bottle insertable into the bottle receptacle and comprising a top, which engages the lower sealing surface when inserted fully into the receptacle;
a bottle release actuator having a vertically elevated state and a vertically depressed state; and
a latch comprising a slidable latch plunger that retains the bottle in the receptacle in a latched state and releases the bottle from the receptacle in a released state, wherein the bottle release actuator is vertically movable relative to the slidable latch plunger, and wherein the latch comprises a mechanism that is configured to translate vertical displacement of the bottle release actuator into lateral displacement of the slidable latch plunger, between the latched state and the released state, wherein the mechanism comprises a diagonally oriented groove and a guide pin, which slides along the diagonally oriented groove.

* * * * *